(12) United States Patent
Ouzounis et al.

(10) Patent No.: US 10,372,984 B2
(45) Date of Patent: Aug. 6, 2019

(54) SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS

(71) Applicant: DigitalGlobe, Inc., Longmont, CO (US)

(72) Inventors: Georgios Ouzounis, Longmont, CO (US); Kostas Stamatiou, Longmont, CO (US); Nikki Aldeborgh, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 23 days.

(21) Appl. No.: 15/802,313

(22) Filed: Nov. 2, 2017

(65) Prior Publication Data

US 2018/0330187 A1 Nov. 15, 2018

Related U.S. Application Data

(60) Provisional application No. 62/505,074, filed on May 11, 2017.

(51) Int. Cl.
| | |
|---|---|
| *G06K 9/62* | (2006.01) |
| *G06K 9/00* | (2006.01) |
| *G06T 7/00* | (2017.01) |
| *G06T 7/90* | (2017.01) |
| *G06F 16/583* | (2019.01) |

(Continued)

(52) U.S. Cl.
CPC ....... *G06K 9/0063* (2013.01); *G06F 16/5854* (2019.01); *G06K 9/00637* (2013.01); *G06K 9/627* (2013.01); *G06K 9/6215* (2013.01); *G06K 9/6219* (2013.01); *G06K 9/6221* (2013.01); *G06K 9/6242* (2013.01); *G06K 9/6267* (2013.01); *G06K 9/6282* (2013.01); *G06T 7/0002* (2013.01); *G06T 7/0004* (2013.01); *G06T 7/11* (2017.01); *G06T 7/12* (2017.01); *G06T 7/90* (2017.01); *G06K 9/40* (2013.01); *G06T 2207/10036* (2013.01);
(Continued)

(58) Field of Classification Search
CPC ...... A63F 13/327; A63F 13/213; A63F 13/25; A63F 13/32; A63F 13/332; A63F 13/335; A63F 13/655; A63F 13/00; G06T 7/55; G06T 3/0068; G06T 15/04; G06T 7/12; G06T 7/11; G06T 7/90; G06T 7/0002; G06T 7/0004; G06K 9/00228; G06K 9/0063; G06K 9/00637; G06K 9/6215; G06K 9/6219; G06K 9/6221; G06K 9/6242; G06K 9/6267; G06K 9/627; G06K 9/6282; G06F 16/5854
See application file for complete search history.

(56) References Cited

U.S. PATENT DOCUMENTS 8,682,079 B1 * 3/2014 Ouzounis ........... G06K 9/00637
382/190

* cited by examiner

*Primary Examiner* — Duy M Dang
(74) *Attorney, Agent, or Firm* — Brian R. Galvin; Galvin Patent Law, LLC

(57) ABSTRACT

A system and various methods for processing an image to produce a hierarchical image representation model, segment the image model using shape criteria to produce positive and negative training data sets as well as a search-space data set comprising shapes matched to a search query provided as input, and using the training data sets to train a machine learning model to improve recognition of shapes that are similar to an input query without being exact matches, to improve object recognition.

12 Claims, 12 Drawing Sheets

(51) Int. Cl.
*G06T 7/12* (2017.01)
*G06T 7/11* (2017.01)
*G06K 9/40* (2006.01)

(52) U.S. Cl.
CPC ............... *G06T 2207/30181* (2013.01); *G06T 2207/30184* (2013.01); *G06T 2207/30188* (2013.01)

US 10,372,984 B2

SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS

CROSS-REFERENCE TO RELATED APPLICATIONS

This application claims priority to U.S. provisional patent application Ser. No. 62/505,074, titled "SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS" and filed on May 11, 2017, the entire specification of which is incorporated herein by reference.

BACKGROUND

Field of the Art

The disclosure relates to the field of machine learning, and more particularly to the field of automatically producing training and test data for machine learning applications.

SUMMARY

Accordingly, the inventor has conceived and reduced to practice, a system and methods for shape-based segmentation using hierarchical image representations for automatic training data generation and search space specification for machine learning algorithms.

The aspects described herein embody a system and various methods for processing an image to produce a hierarchical image representation model, segment the image using shape criteria to produce positive and negative training data sets as well as a search-space data set comprising shapes matched to a search query provided as input, and using the training data sets to train a machine learning model to improve recognition of shapes that are similar to an input query without being exact matches, to improve object recognition.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
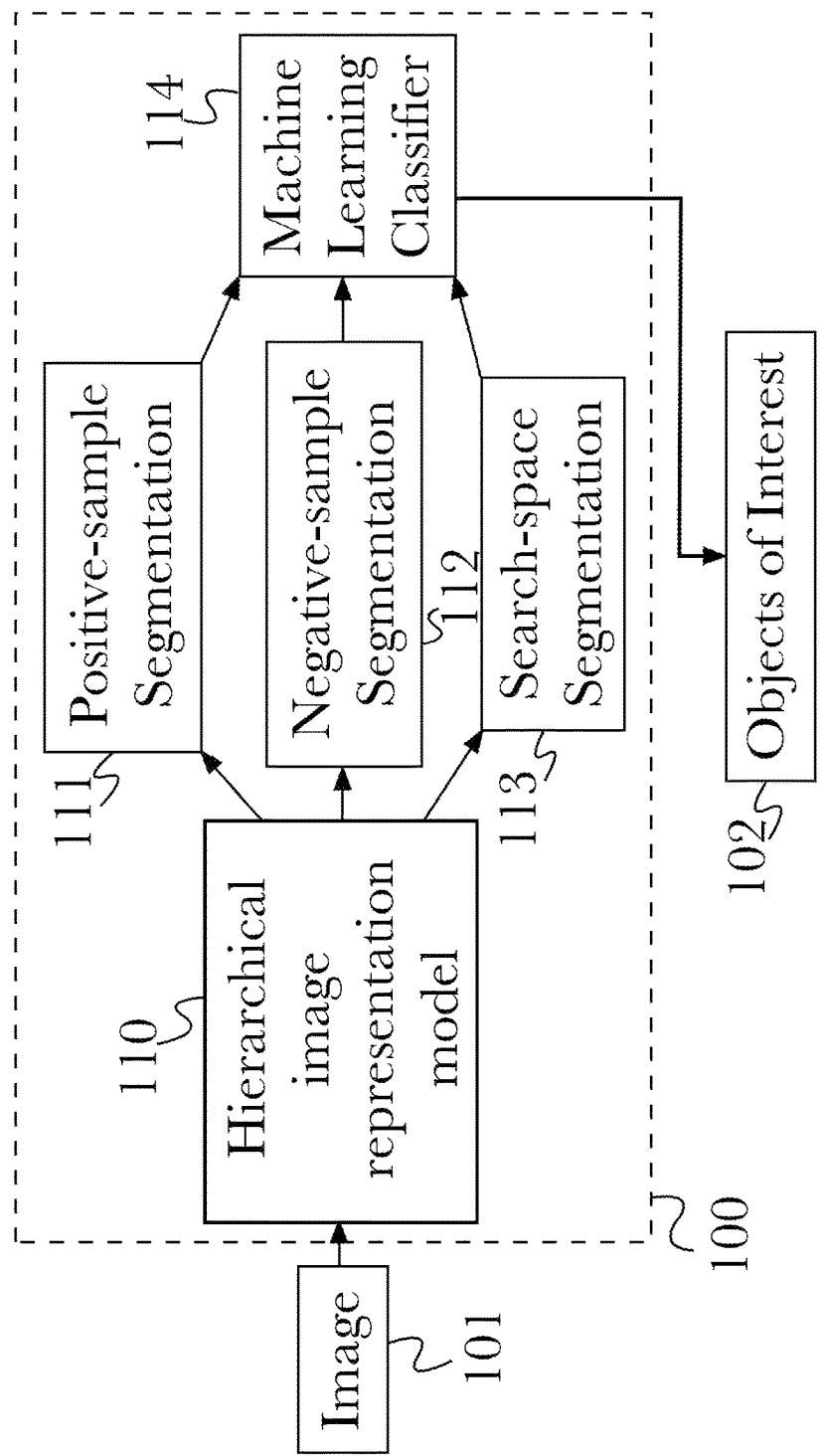
FIG. 1 is a block diagram illustrating an exemplary process overview for shape-based segmentation using hierarchical image representations for automatic training data generation and search space specification for machine learning algorithms, according to one aspect.

The inventor has conceived, and reduced to practice, a system and methods for shape-based segmentation using hierarchical image representations for automatic training data generation and search space specification for machine learning algorithms.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary process overview 100 for shape-based segmentation using hierarchical image representations for automatic training data generation and search space specification for machine learning algorithms, according to one aspect. According to the aspect, an image 101 may be taken as input for processing using shape-based segmentation 100 in order to produce a set of objects of interest 102 recognized within the image space. This may be accomplished by first generating a hierarchical representation 110 of image 101, for example using a max-tree or alpha-tree algorithm, as described below with reference to FIG. 5. The hierarchical image representation model 110 is then used to produce three individual segmentations of the image, by selecting components within the hierarchical representation 110 using the object class shape to group recognized shapes that are similar to a defined object class (for example, "oil tank", as described below with reference to FIG. 6) into a positive-sample training segmentation 111, shapes that largely differ from the object class into a negative-sample training segmentation 112, and shapes that are relatively similar to a defined object of interest into a search-space segmentation 113 that reflects the results of a search query as applied to the image 110 in question. A machine learning classifier 114 such as (for example) an artificial neural network may be utilized to train on positive 111 and negative 111 sample sets to improve recognition of objects found in the search-space sample set 113, for example by learning additional characteristics of image samples beyond simple shape recognition (for example, including but not limited to color, size, orientation, texture or other spectral properties). By utilizing segmentation and machine learning in this manner, images may be reliably segmented so that a search-space segmentation will be reduced to contain most or all of the objects of interest, as well as objects that are determined to be similar based on the machine-learning analysis.

Figure 2:
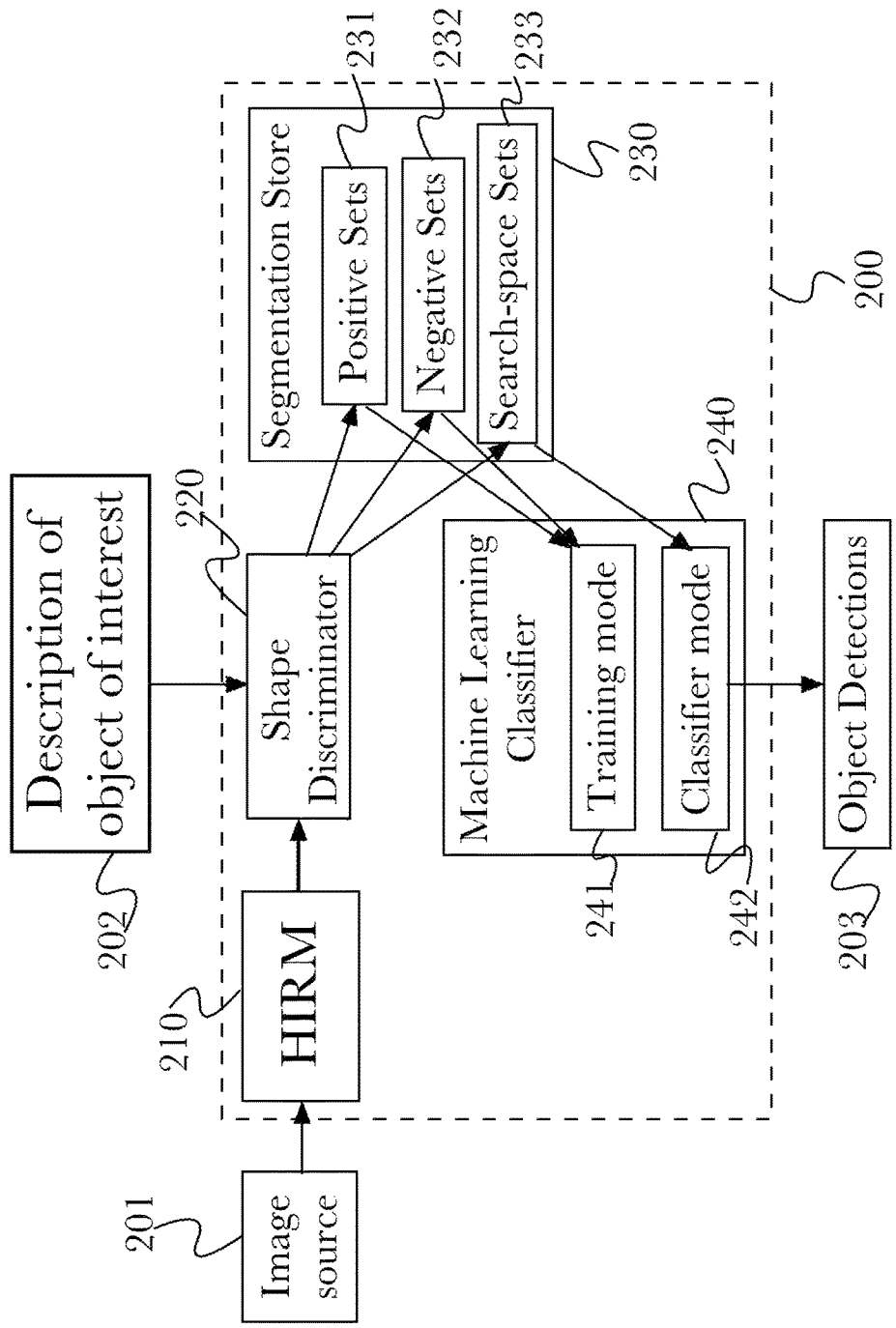
FIG. 2 is a block diagram illustrating an exemplary system architecture for shape-based segmentation using hierarchical image representations for automatic training data generation and search space specification for machine learning algorithms, according to one aspect.

FIG. 2 is a block diagram illustrating an exemplary system architecture 200 for shape-based segmentation using hierarchical image representations for automatic training data generation and search space specification for machine learning algorithms, according to one aspect. According to the aspect, a database 201 or other data storage medium may be used as an image input source, storing and providing images for segmentation and searching as needed. A hierarchical model generator 210 may receive images and produce hierarchical representations for use in segmentation, for example using an alpha-tree algorithm as described below in FIG. 5. A shape discriminator 220 may receive a hierarchical image representation and a description of an object of interest 202, and may then segment that image into positive 231 and negative 232 training sets and a search-space 233 set, which may be stored in a segmentation data store 230 for future use. Training sets may be used by a machine learning classifier 240 operating in a training mode 241, to learn shapes and other attributes to improve operation when running in a classifier mode 242. In classifier mode 242, machine learning classifier 240 may retrieve any new hierarchical image representation model along with a search-space segmentation set 233, to identify objects of interest and similar objects within the hierarchy for output 203. When segmenting based on shapes, image regions may be delineated to improve recognition and expedite operation, rather than performing a strict pixel-by-pixel recognition operation. Image regions may be selected automatically using available information both within the image and stored from previous operations, to select areas where objects are likely to occur (for example, if it has been learned that a particular object tends to appear near bodies of water within an image space).

DETAILED DESCRIPTION OF EXEMPLARY ASPECTS

Figure 3A:
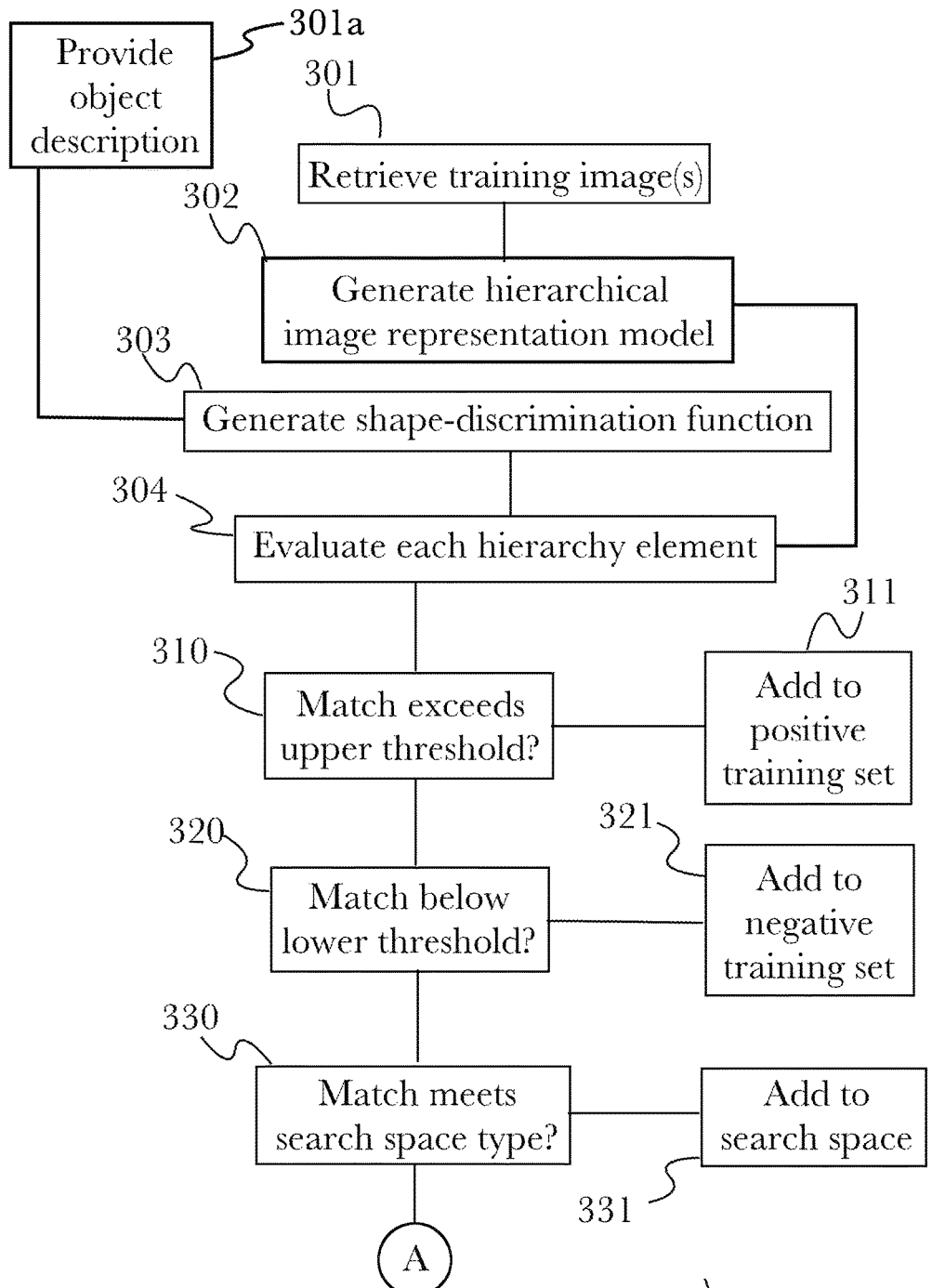
FIG. 3A is a flow diagram illustrating an exemplary method for shape-based segmentation using hierarchical image representations, according to one aspect.

FIG. 3A is a flow diagram illustrating an exemplary method 300 for shape-based segmentation using hierarchical image representations, according to one aspect. In an initial step 301, a plurality of training images may be retrieved (such as from an image database 201) by a hierarchy generator 210, optionally along with a description 301a for any objects of interest, and hierarchy generator 210 may then use the training images to create a hierarchical image representation for each training image (and any associated objects descriptions) 302. In a next step 303, a machine learning classifier 240 may generate a shape discrimination function to identify shapes based on the description of an object of interest, and may then use this function to evaluate items within the hierarchy 304. For each object identified in the hierarchy, if the object exceeds an upper similarity threshold 310, the object is added to a positive-sample training set 311, and if the object fails to meet a lower similarity threshold 320 it is placed into a negative-sample training set 321. If the object matches the search-space object type 330, it is placed into a search-space sample set 331, to encompass all objects that are "similar enough" to the object of interest, optionally including those that may have been added to a positive-sample training set previously ("best match" objects are valuable for training, and also as positive results for an object search). When the hierarchy has been exhausted and all objects have been classified into their appropriate segments, operation may continue as described below in FIG. 3B.

Figure 3B:
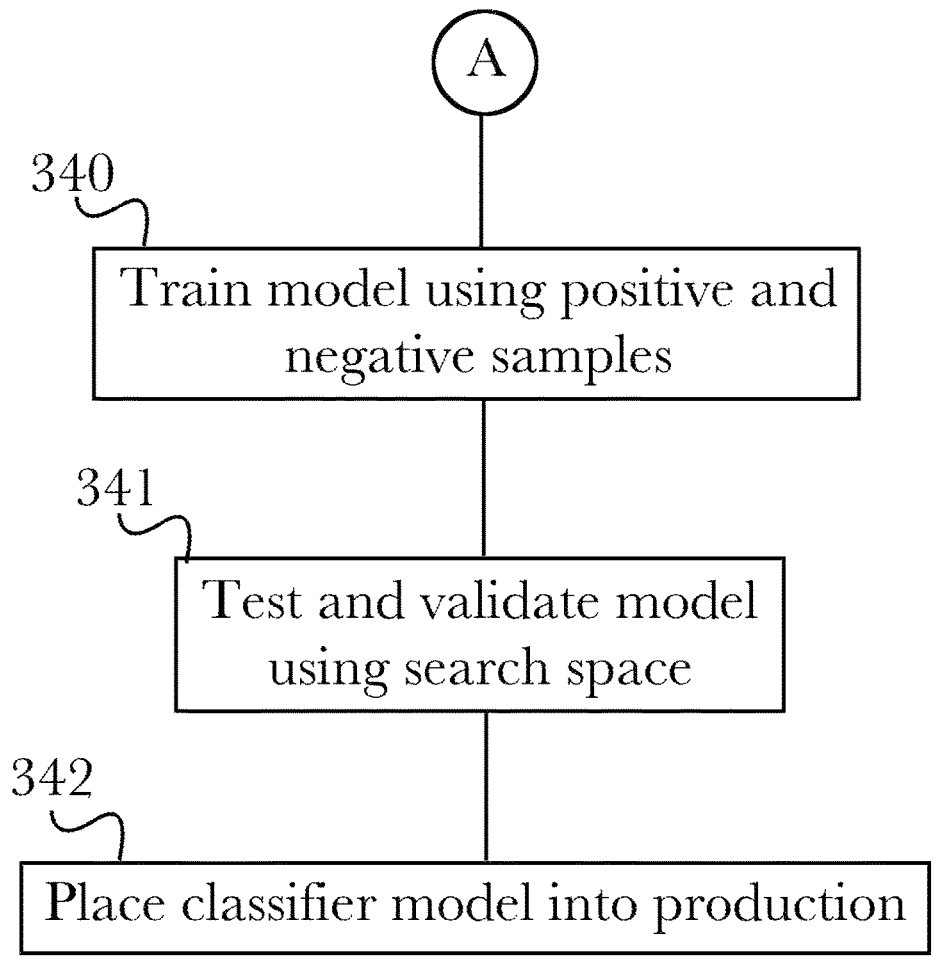
FIG. 3B is a flow diagram illustrating an exemplary method for training and validation of a data model using segmentations, according to one aspect.

FIG. 3B is a flow diagram illustrating an exemplary method for training and validation of a data model using segmentations, according to one aspect. In an initial step 340, a plurality of positive-sample and negative sample training sets may be used to train a machine learning classifier 240 on known positive and negative matches respectively to train the machine learning model to recognize objects that are certain to be matches or definitive no matches for a given object class. In a next step 341, the model may then be tested and validated against a search-space sample set, to see if the produced output matches the anticipated output, which indicates the model has been properly trained for the object class. If the model passes validation, it may then 342 be put into production and used to process images for the object class in search queries.

Figure 4:
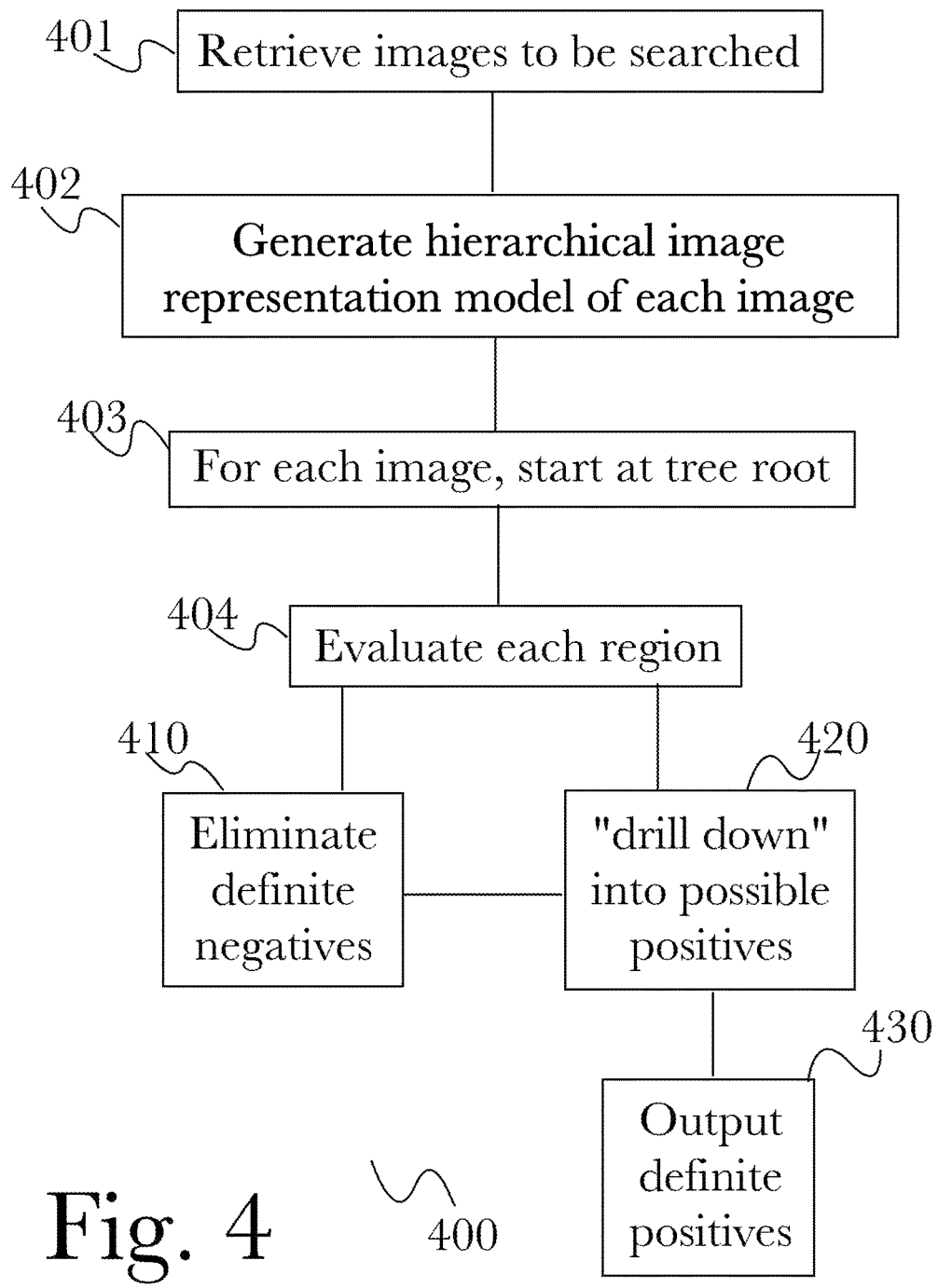
FIG. 4 is a flow diagram illustrating an exemplary method for eliminating negative results and determining positive results in a tree-type hierarchical image model, according to one aspect.

FIG. 4 is a flow diagram illustrating an exemplary method 400 for eliminating negative results and determining positive results in a tree-type hierarchical image model, according to one aspect. In an initial step 401, a plurality of images may be retrieved by a hierarchy generator 210 for use, such as from an image database 201. In next step 402, a tree-type hierarchical representation may be produced by the hierarchy generator 210 for each image retrieved. Then, starting at the root of each hierarchical tree 403, each region of the image may be evaluated 404 by a machine learning classifier 240, comparing attributes of objects within each region against those of an object class. Objects that are certain to be negative results (that is, they fail to meet a lower similarity threshold relative to the object class) are discarded 410, and uncertain results may be reprocessed 420 to "drill down" into the image until a set of definite positive results is produced 430 after all negative results have been determined and discarded 410.

Figure 5:
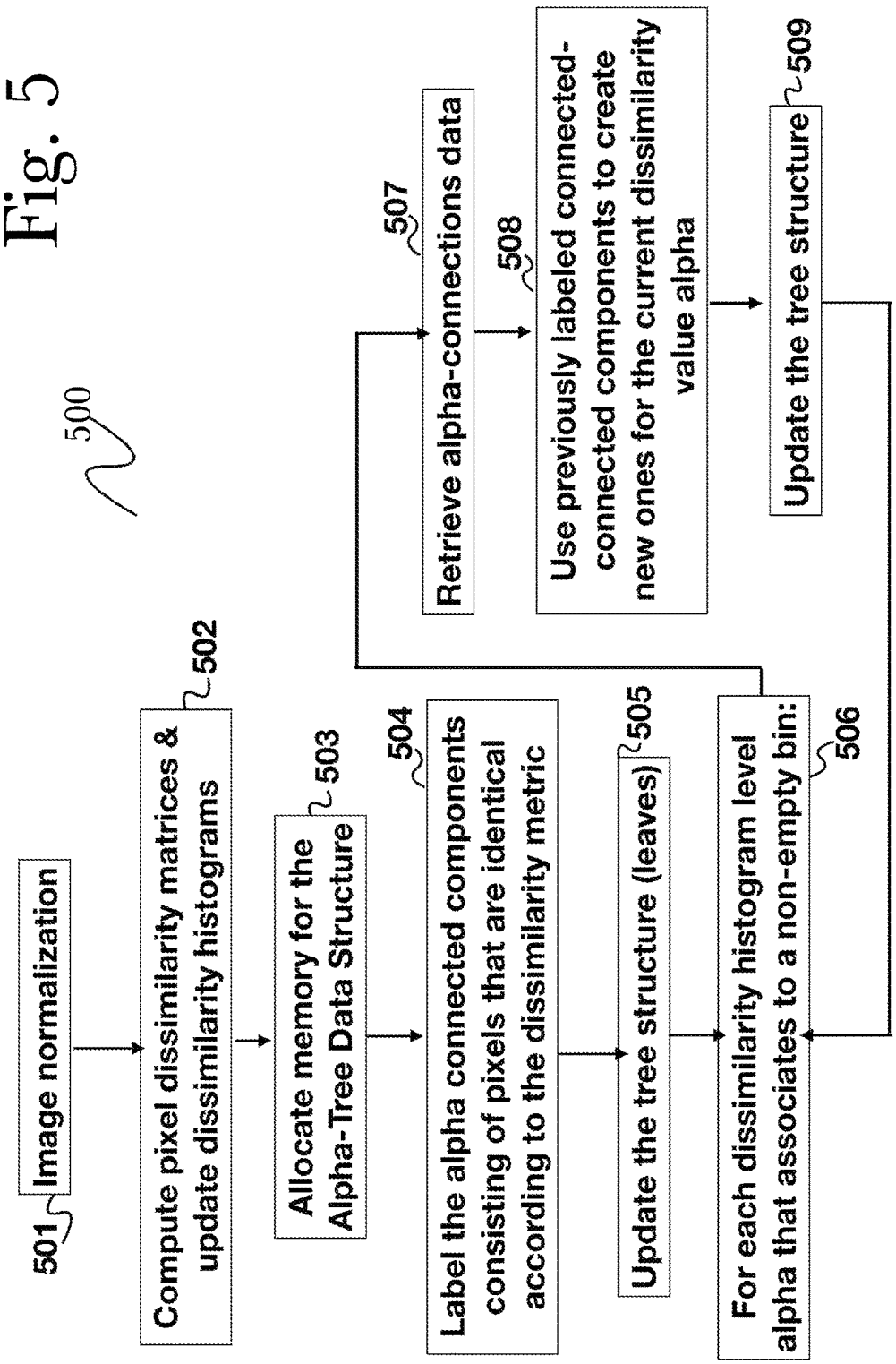
FIG. 5 is a flow diagram illustrating an exemplary method for generating an alpha-tree model, according to one aspect.

FIG. 5 is a flow diagram illustrating an exemplary method 500 for generating an alpha-tree model, according to one aspect. According to the aspect, an alpha-tree model may be utilized as a hierarchical representation of an image, wherein the model encompasses all available image data represented in a structured manner as a rooted, unidirectional tree model. An alpha-tree algorithmically processes an image to produce a hierarchical image representation comprising connected components within the image (that is, image regions or points such as pixels, represented as connected components within the image based on their relative adjacency and similarity). In an alpha-tree, the root represents the "tip" of an alpha-hierarchy, or the single connected component within the image whose extent defines the entire image definition domain, and the leaves correspond to the reference connected components of the input image (pixels, or image regions consisting of pair-wise adjacent pixels, that are identical according to some dissimilarity measure). This model includes all image information in its corpus, and can therefore accept any number of various spectral bands in an image, whereas other models generally require an image to be converted to greyscale for processing, resulting in loss of information.

FIG. 5 is a flow diagram illustrating an exemplary method 500 for generating an alpha-tree model, according to one aspect. To produce an alpha-tree model, in an initial step 501 the set of spectral bands of an image may be normalized to a pre-specified intensity range. Given a definition of pixel dissimilarity, a pair of dissimilarity matrices may then be computed 502; one for dissimilarities computed between each pixel and its immediate neighbor in the vertical direction (closer to the origin according to the scan-line order) and one for each pixel and its immediate neighbor in the horizontal direction (closer to the origin according to the scan-line order). A dissimilarity histogram may be updated as the two matrices are computed. Using the dissimilarity statistics derived from the histogram, an accurate memory allocation for the alpha-tree model may be performed 503. Next, in 504, disjoint image regions of maximal extent, consisting of pair-wise adjacent pixels that are identical according to the definition of pixel dissimilarity, may be identified and labeled using a union-find algorithm. The regions may be referred to as alpha-connected components and may be defined for dissimilarity value of 0. The 0-connected components are the leaves of the tree model. Each connected component label may then be interpreted into a tree node index and the alpha-tree model may be updated accordingly 505. In loop operation, each level of the dissimilarity histogram (alpha-value) that associates to a non-empty bin may be retrieved 506. Each retrieved alpha value and the dissimilarity statistics are read from the histogram 507. Previously-labeled connected component may then be used to create new ones 508. For each new pixel connection requested from the dissimilarity matrices, the connected components established at previous (smaller) alpha levels which contain the pixels of interest are retrieved and a connection is established, thus creating new coarser connected components at level alpha. For every new alpha level component labeling the alpha-tree model is updated 509. The loop terminates when the process 500 concludes for the last dissimilarity level of the histogram.

Figure 6:
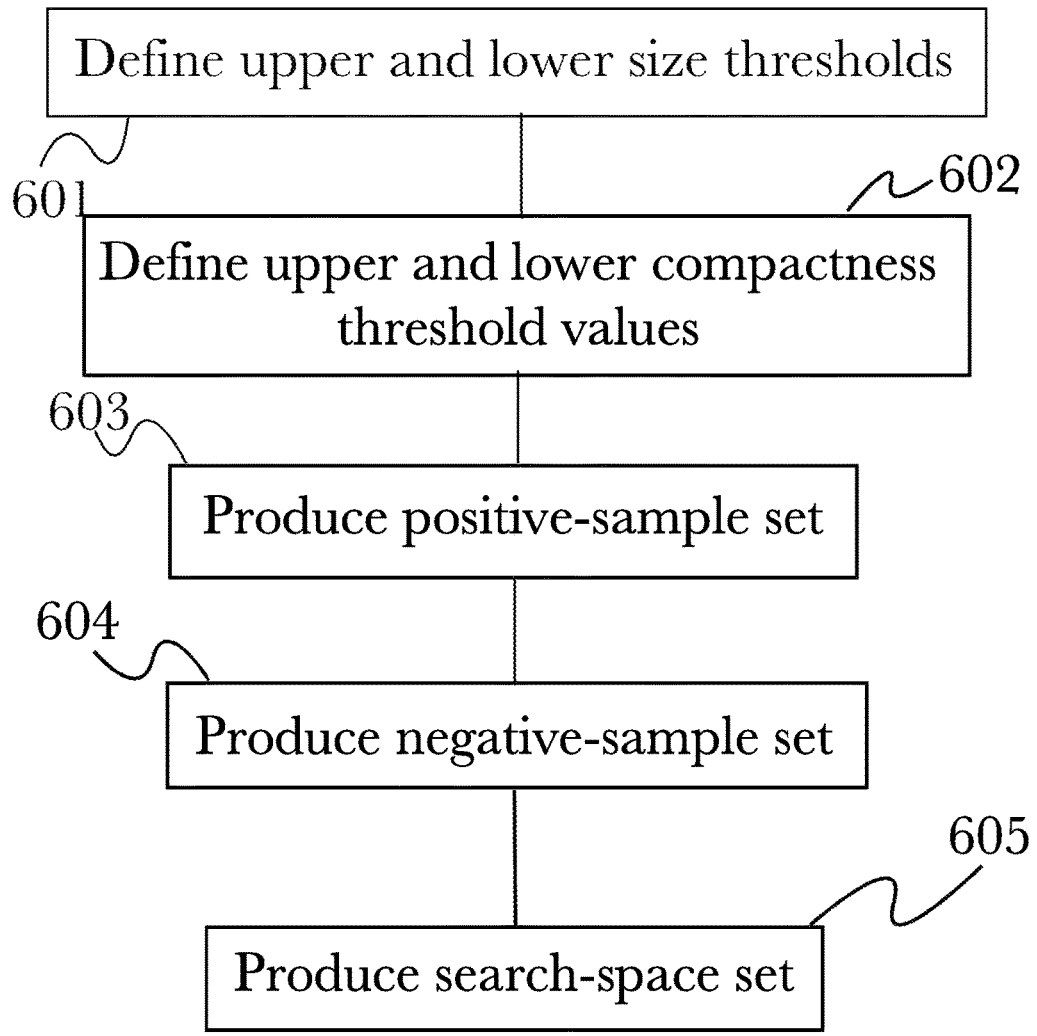
FIG. 6 is a flow diagram illustrating an exemplary method for using shape-based segmentation to identify oil tanks in an image space.

FIG. 6 is a flow diagram illustrating an exemplary method 600 for using shape-based segmentation to identify oil tanks in an image space. In a first step 601, two size thresholds may be defined to ensure that objects identified fall within an acceptable range of oil tank size, to avoid picking up circular objects that are too large or too small (such as large circular city structures like a stadium, or very small ones such as a trampoline in a residential backyard). A single "compactness" threshold may be set 602 to identify oil tanks based on the fill level, detecting "how circular" they appear in the image based on the height of the tank roof (which generally floats on surface of the oil at the current fill level). As oil is drained from a tank, the roof lowers, creating shadows and causing an effect similar to lunar phases wherein the circular shape becomes slowly truncated from one edge, until a middle point is reached and it may be viewed as a truncated circle being filled out (albeit this time, a circle of shadow and not reflective oil tank roof material), until a complete circular object is seen again (an empty tank with the roof at the lowest level, completely shadowed inside the walls of the tank). In a first identification pass 603, compactness may be set to (for example) a 99% threshold, returning only full or nearly-full tanks but excluding any partially-filled tanks with partially-shaded roofs, and creating a positive-sample training set (all objects identified are known with confidence to be oil tanks, as they meet the most stringent definitions set). A second pass 604 may then identify all known negative matches to remove them and form a negative-sample set, such as objects that fall outside the defined size thresholds and therefore cannot be oil tanks. After creating the positive and negative-sample sets, the search-space is defined by changing the compactness value 605 to (for example) 60%, and then performing a final object recognition pass 606 returning all partially-filled oil tanks with a high degree of confidence by accommodating partially-shaded rooftops while remaining within the size constraints and ignoring all previously-identified negative samples.

According to this method, a positive training set will then comprise all objects or structures recognized that meet the given similarity criteria, but this may not necessarily include all oil tanks within the image space. For example, a number of oil tanks may have been partially-filled at the time, causing the roof (which is generally floating on the surface of the oil in the tank) to be lower, creating shadows that may disrupt recognition when keying on object reflectiveness or other visual attributes. In the second pass to determine all the negative samples, any objects that are known not to be matches are excluded from the search space, such as objects that are too large or small, or have the wrong shape (for example, rejection office buildings that have a completely different shape than an oil tank). After these two passes are complete, there may still be objects left that have not been assigned to a set (generally, objects that "might" be oil tanks, but are neither a certain positive or negative result). Using an alpha-tree model, regions that are known NOT to have any oil tanks may be eliminated, leaving regions with the unknown objects that may then be compared against the positive training set and defined criteria values to iteratively "zero in" on the remaining oil tanks.

Figure 7:
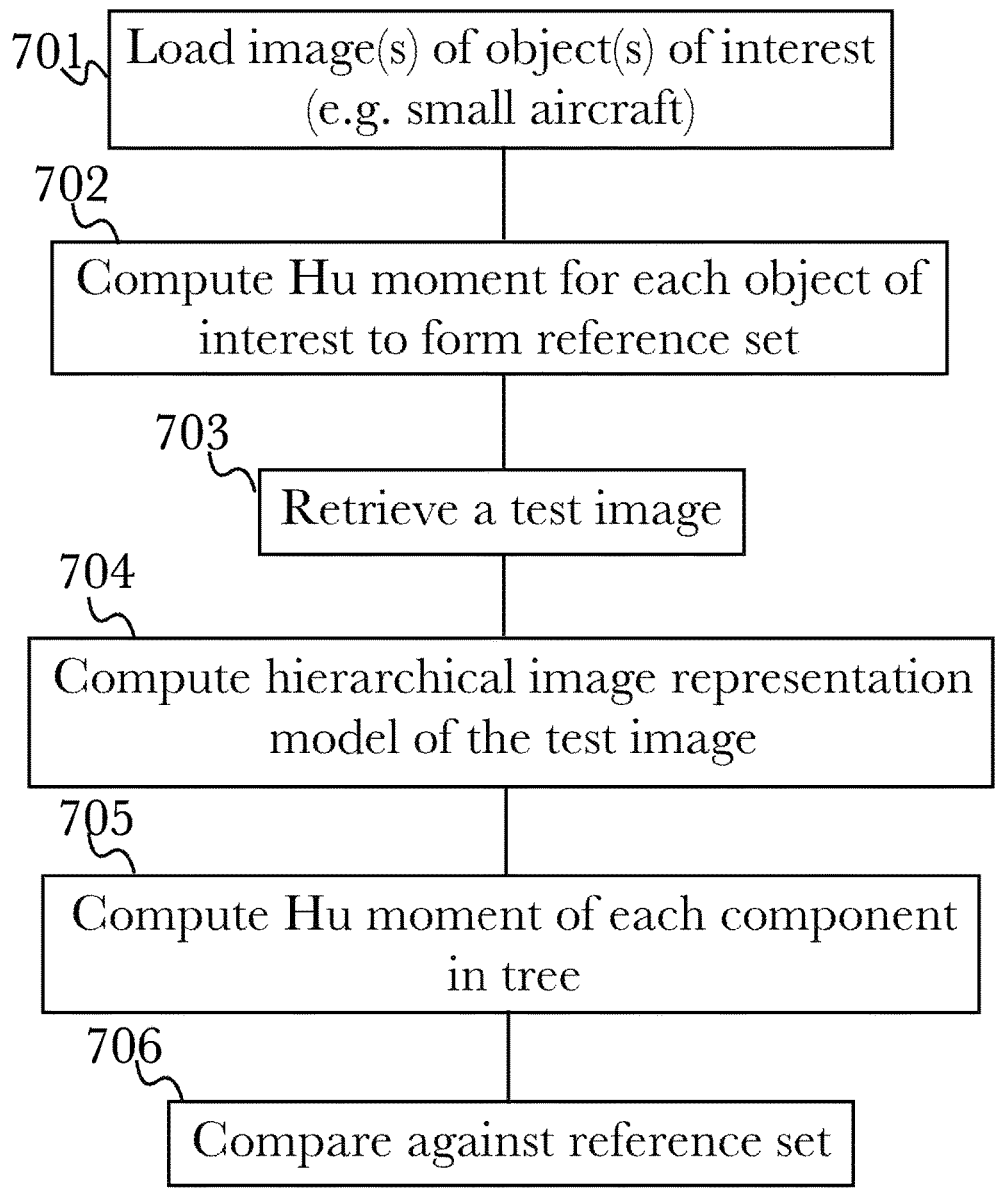
FIG. 7 is a flow diagram illustrating an exemplary method for using shape-based segmentation to identify aircraft in an image space.

FIG. 7 is a flow diagram illustrating an exemplary method 700 for using shape-based segmentation to identify aircraft in an image space. Reliably recognizing aircraft under various real-world conditions such as in-flight may require additional training to improve reliability of results. Images of single aircraft may be used to train an initial object class 701 ("what aircraft look like"), but this may not be adequate to reliably recognize a significant portion of aircraft during flight, when image characteristics may be highly complex such as oblique angles, reflections and shadows, or partial images such as an aircraft that is crossing an image boundary. In addition to values of size and alternative to compactness or other scalar metrics (as described above, in FIG. 6), an additional set of values may be computed 702 known as image moments for each component of each hierarchical image representation. An example is the set of Hu moment invariants. Moments can accurately describe the shape of an aircraft or any other complex object with high confidence. The set of each object's moments may then be used to define a positive-sample training set by retrieving a test image 703 and computing a hierarchical image representation model for the test image 704. Then, the Hu moment of each component in the test image tree model is computed 705 and compared against a reference set 706, selecting anything that is a close match to the reference set of moments describing the object class (which is therefore a relatively ideal image of an aircraft). Any component described by a set (vector) of moments that is very dissimilar to the reference set of moments may be added to the negative-sample training set, or if similar enough according to some similarity threshold may be added to the search-space storage. This will yield a reliable recognition of aircraft under less ideal conditions having learned what aircraft look like with respect to more than a single parameter. Additionally, it should be appreciated that the methods of FIG. 6 and FIG. 7 can be adapted to account for more complex shape descriptors.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
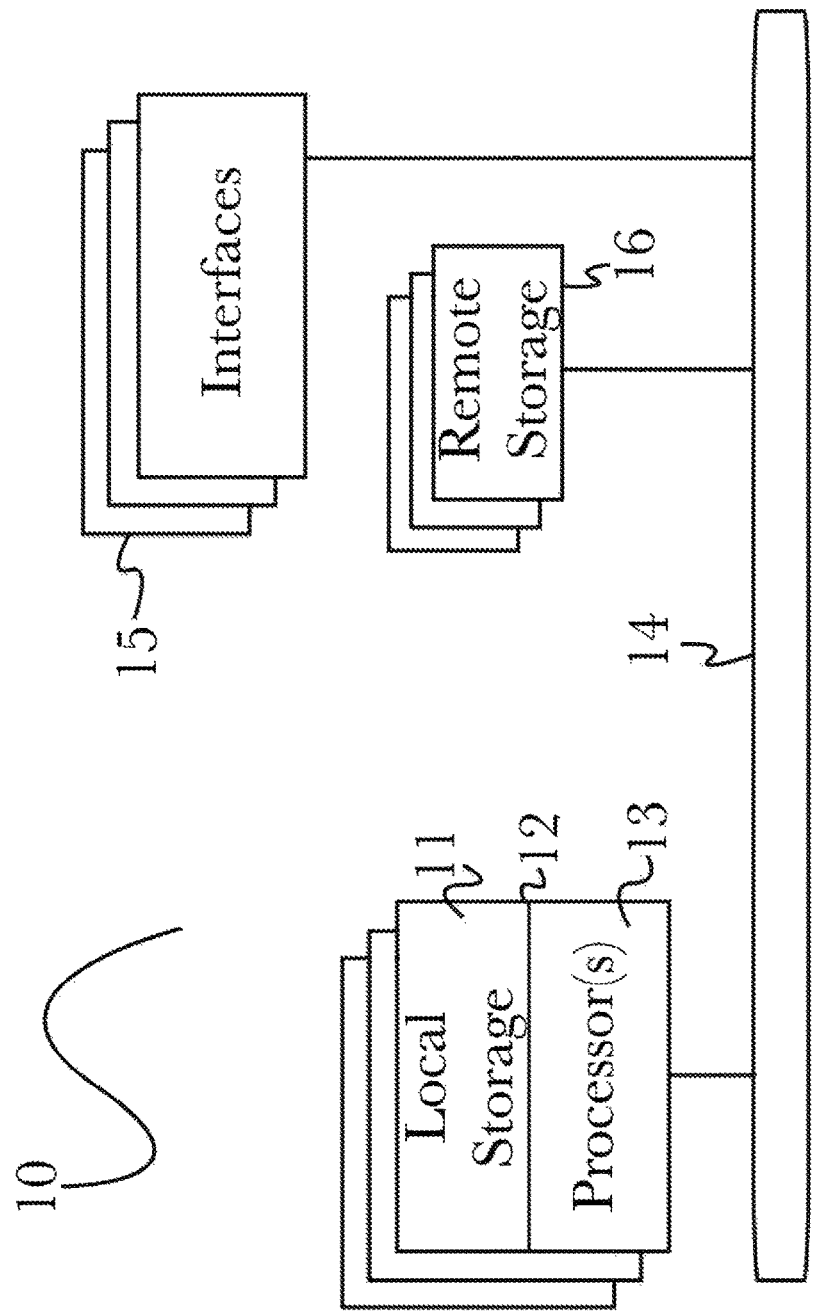
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
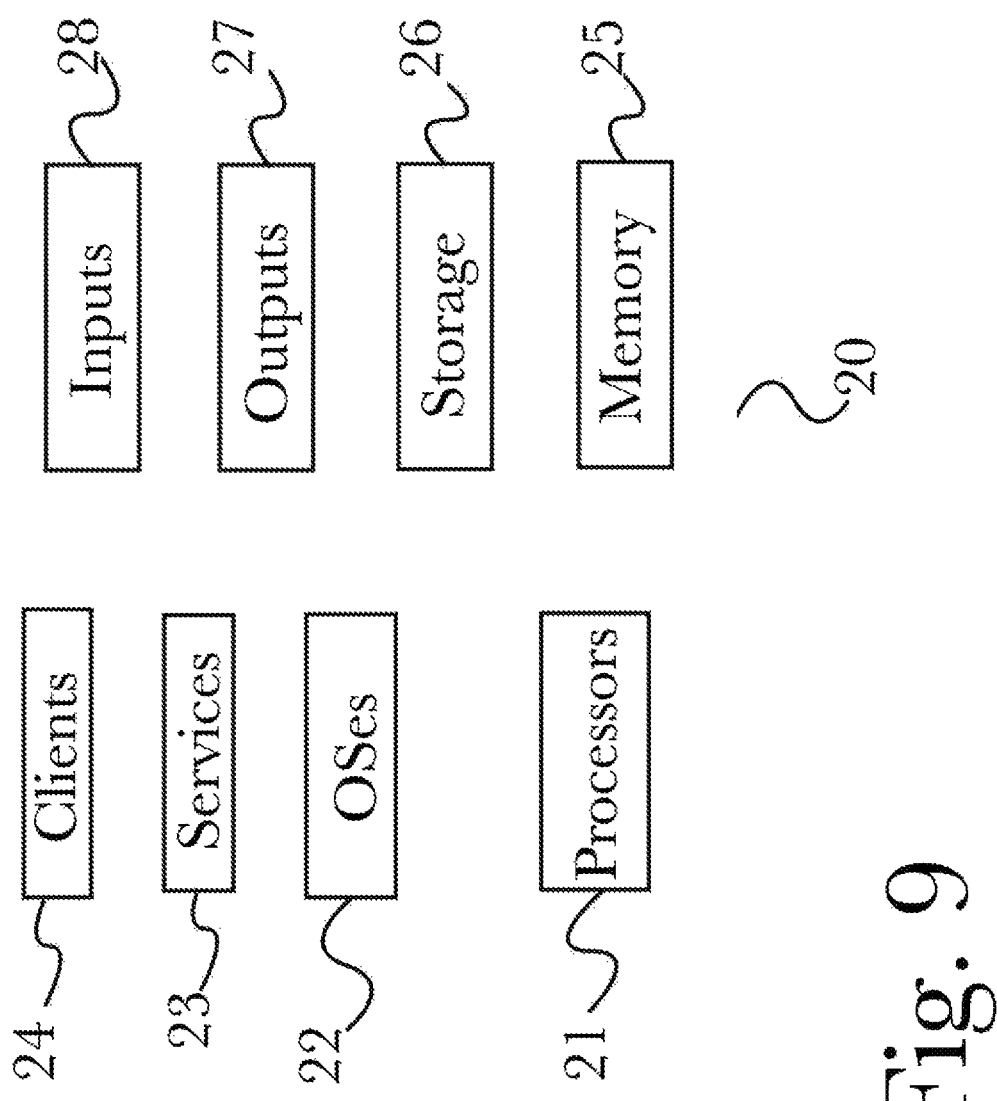
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
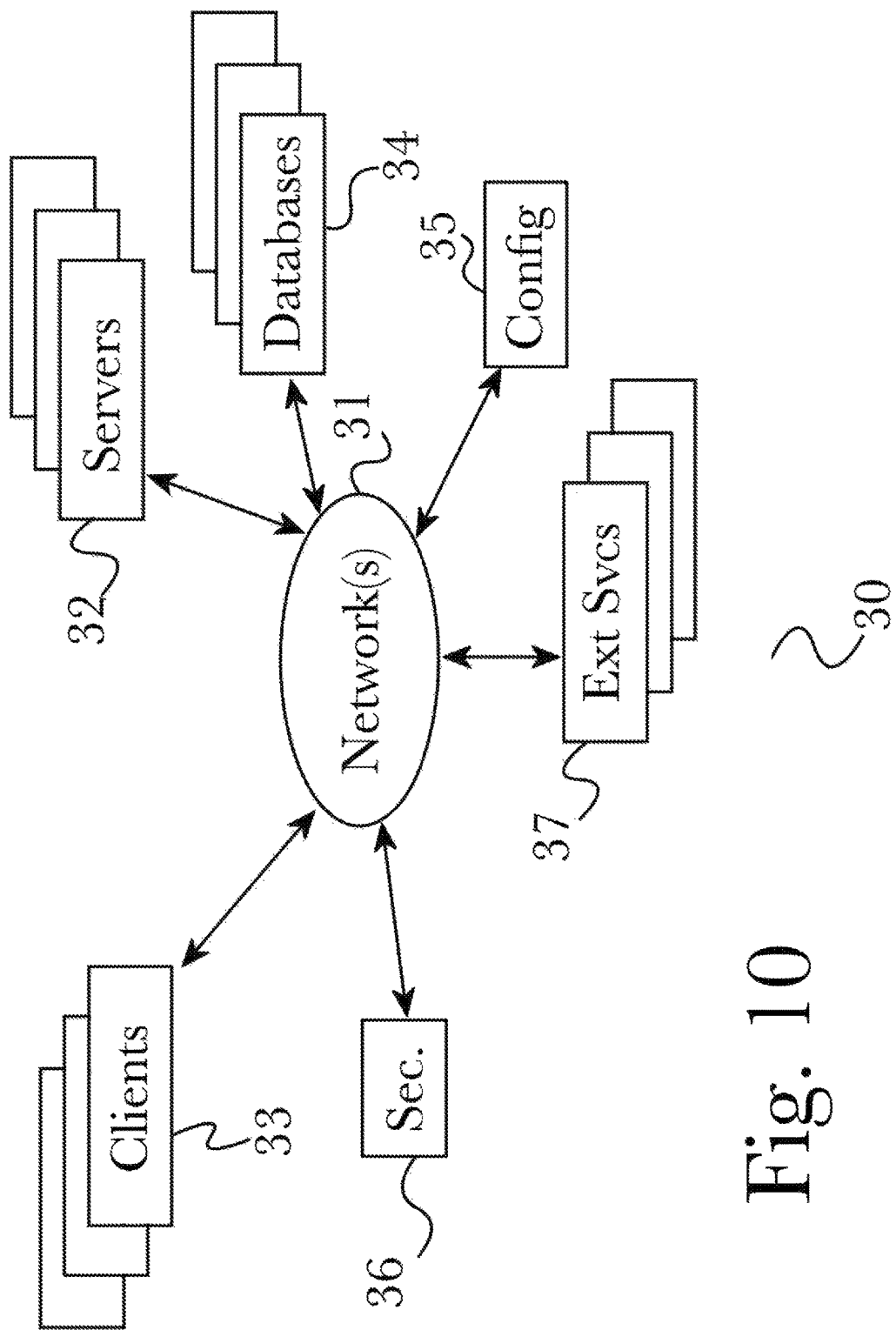
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
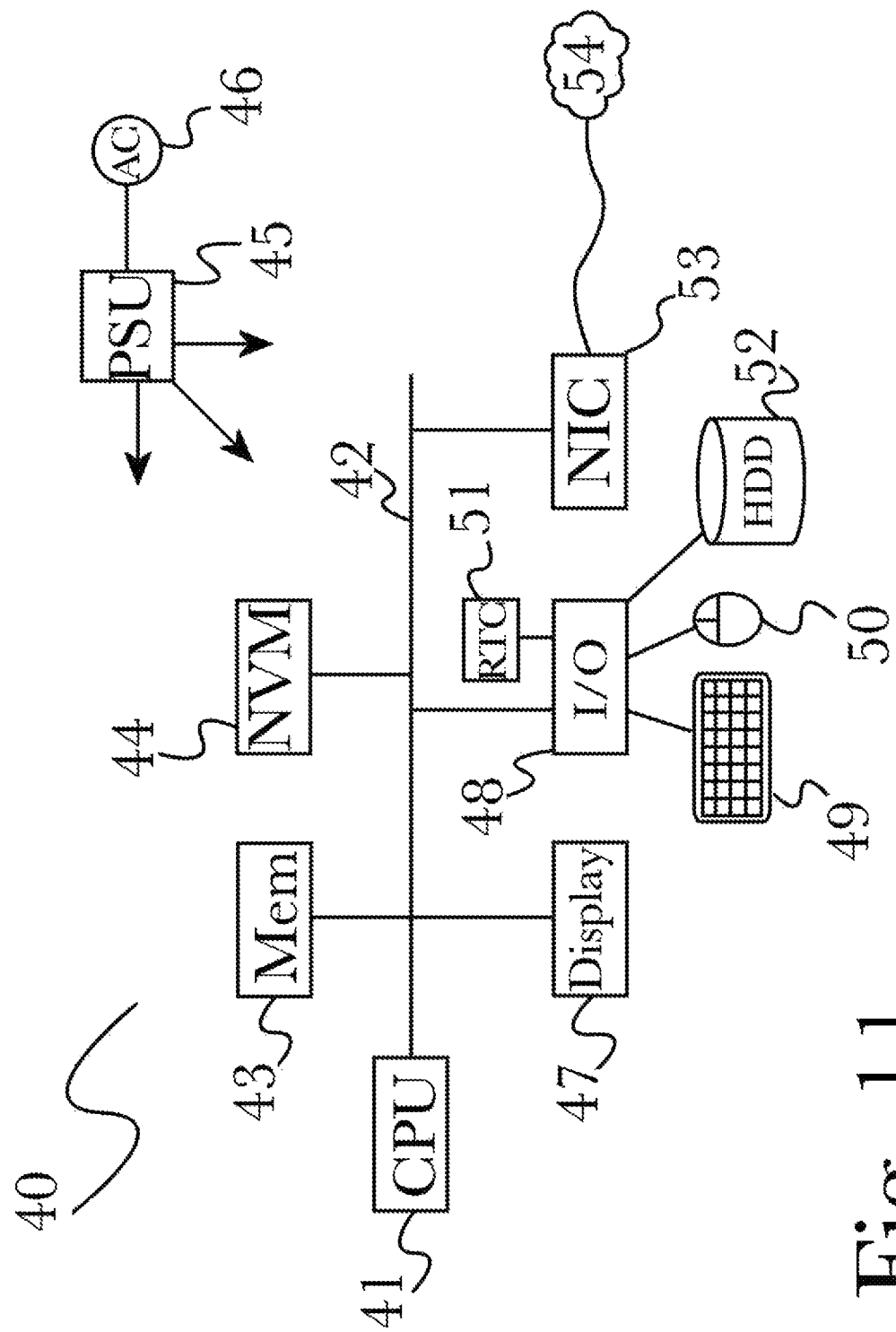
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for shape-based segmentation using hierarchical image representations, comprising:
    a hierarchy generator comprising at least a plurality of programmable instructions stored in a memory and operating on a processor of a computing device, wherein the programming instructions, when operating on the processor, cause the processor to:
    receive an image via the network;
    algorithmically process the image to produce a hierarchical image model of image information within the image;
    a shape discriminator comprising at least a plurality of programming instructions stored in another memory and operating on another processor of another computing device and coupled to the hierarchy generator, wherein the programming instructions, when operating on the processor, cause the processor to:
    receive a hierarchical image model from the hierarchy generator;
    process the hierarchical image model to identify a plurality of objects within the image;
    produce a plurality of object sets based at least in part on the objects identified;
    a machine learning classifier comprising at least a plurality of programming instructions stored in another memory and operating on another processor of another computing device and coupled to the shape discriminator, wherein the programming instructions, when operating on the processor, cause the processor to:
    receive the plurality of object sets from the shape discriminator;
    compare at least a portion of the plurality of object sets against the hierarchical model;
    produce a final set of identified objects based at least in part on the comparison results; and
    provide the final set of identified objects as output.

2. The system of claim 1, wherein the plurality of objects within the image comprise at least an oil tank.

3. The system of claim 2, wherein the hierarchical image model comprises at least information representing the shape of an oil tank.

4. The system of claim 2, wherein the hierarchical image model comprises at least information representing the fill level of an oil tank.

5. The system of claim 1, wherein the plurality of objects within the image comprise at least an aircraft.

6. The system of claim 5, wherein the hierarchical image model comprises at least information representing the shape of an aircraft.

7. A method for shape-based segmentation using hierarchical image representations, comprising the steps of:
    receiving, at a hierarchy generator comprising at least a plurality of programmable instructions stored in a memory and operating on a processor of a computing device, an image via the network;
    algorithmically processing the image to produce a hierarchical image model of image information within the image;
    receiving, at a shape discriminator comprising at least a plurality of programming instructions stored in another memory and operating on another processor of another computing device and coupled to the hierarchy generator, a hierarchical image model from the hierarchy generator;
    processing the hierarchical image model to identify a plurality of objects within the image;
    producing a plurality of object sets based at least in part on the objects identified;
    receiving, at a machine learning classifier comprising at least a plurality of programming instructions stored in another memory and operating on another processor of another computing device and coupled to the shape discriminator, the plurality of object sets from the shape discriminator;
    comparing at least a portion of the plurality of object sets against the hierarchical model;
    producing a final set of identified objects based at least in part on the comparison results; and
    providing the final set of identified objects as output.

8. The method of claim 7, wherein the plurality of objects within the image comprise at least an oil tank.

9. The method of claim 8, wherein the hierarchical image model comprises at least information representing the shape of an oil tank.

10. The method of claim 8, wherein the hierarchical image model comprises at least information representing the fill level of an oil tank.

11. The method of claim 7, wherein the plurality of objects within the image comprise at least an aircraft.

12. The method of claim 11, wherein the hierarchical image model comprises at least information representing the shape of an aircraft.

* * * * *